(12) United States Patent
Rojeski

(10) Patent No.: US 8,481,214 B2
(45) Date of Patent: Jul. 9, 2013

(54) ELECTRODES INCLUDING SUPPORT FILAMENT WITH COLLAR STOP

(75) Inventor: Ronald Anthony Rojeski, San Jose, CA (US)

(73) Assignee: Catalyst Power Technologies, Campbell, CA (US)

( * ) Notice: Subject to any disclaimer, the term of this patent is extended or adjusted under 35 U.S.C. 154(b) by 335 days.

(21) Appl. No.: 12/904,113

(22) Filed: Oct. 13, 2010

(65) Prior Publication Data

US 2011/0027655 A1 Feb. 3, 2011

Related U.S. Application Data

(63) Continuation-in-part of application No. 12/392,525, filed on Feb. 25, 2009, now Pat. No. 8,420,258.

(60) Provisional application No. 61/254,090, filed on Oct. 22, 2009, provisional application No. 61/067,018, filed on Feb. 25, 2008, provisional application No. 61/130,679, filed on Jun. 2, 2008.

(51) Int. Cl.
*H01M 4/76* (2006.01)

(52) U.S. Cl.
USPC ........ 429/238; 429/235; 429/233; 429/218.1; 977/742; 977/734; 977/700; 977/755

(58) Field of Classification Search
USPC .............. 429/235, 238, 233, 218.1; 977/742, 977/734, 700, 755
See application file for complete search history.

(56) References Cited

U.S. PATENT DOCUMENTS

| | | | |
|---|---|---|---|
| 3,775,216 A | 11/1973 | Frentrop | |
| 4,329,403 A | 5/1982 | Baker | |
| 5,705,291 A | 1/1998 | Amatucci et al. | |
| 6,815,121 B2 | 11/2004 | Dasgupta et al. | |
| 7,189,476 B1 | 3/2007 | Macklin et al. | |
| 7,205,069 B2 | 4/2007 | Smalley et al. | |
| 7,220,518 B2 | 5/2007 | Omaru et al. | |
| 7,402,829 B2 | 7/2008 | Green | |
| 7,585,584 B2* | 9/2009 | Choi et al. | 429/524 |
| 8,029,933 B2 | 10/2011 | Ugaji et al. | |
| 8,420,258 B2 | 4/2013 | Rojeski | |
| 2005/0064291 A1* | 3/2005 | Sato et al. | 429/233 |
| 2006/0147797 A1* | 7/2006 | Wu et al. | 429/218.1 |
| 2007/0167101 A1 | 7/2007 | Naruse et al. | |
| 2008/0020193 A1 | 1/2008 | Jang et al. | |
| 2008/0193840 A1* | 8/2008 | Shirane et al. | 429/218.1 |
| 2008/0261116 A1 | 10/2008 | Burton et al. | |
| 2009/0042102 A1 | 2/2009 | Cui et al. | |
| 2009/0169996 A1* | 7/2009 | Zhamu et al. | 429/221 |
| 2010/0178417 A1 | 7/2010 | Connor et al. | |
| 2010/0221596 A1 | 9/2010 | Huggins et al. | |
| 2010/0310941 A1 | 12/2010 | Kumta et al. | |

OTHER PUBLICATIONS

U.S. Appl. No. 12/392,525 non-final Office action mailed Oct. 26, 2011.

(Continued)

*Primary Examiner* — Zachary Best
(74) *Attorney, Agent, or Firm* — Peters Verny, LLP

(57) ABSTRACT

An electrode including structures configured to prevent an intercalation layer from detaching from the electrode and/or a structure configured to create a region on the electrode having a lower concentration of intercalation material. The electrode includes a support filament on which the intercalation layer is disposed. The support filament optionally has nano-scale dimensions.

36 Claims, 12 Drawing Sheets

OTHER PUBLICATIONS

U.S. Appl. No. 12/392,525 Applicant's Amendment A, filed Jan. 25, 2012.
U.S. Appl. No. 12/392,525 final Office action mailed May 9, 2012.
U.S. Appl. No. 12/392,525 Applicant's Amendment B, filed May 21, 2012.
U.S. Appl. No. 12/392,525 non-final Office action mailed Jun. 19, 2012.
U.S. Appl. No. 12/392,525 Applicant's Amendment C, filed Oct. 15, 2012.
CN 20098010618.5 First Office Action mailed Aug. 31, 2012.
Berger, Michale, "Using nanotechnology to improve Li-ion battery performance", Nanowerk Spotlight (www.nanowerk.com), Apr. 7, 2008.
Bourzac, Katherine, "Doubling Lithium-Ion Battery Storage", Technology Review, pp. 1-2. Sep. 17, 2010.
Chan, Candace K., et al., "High-performance lithium battery anodes using silicon nanowires", Nature Nanotechnology, 3, 31-36, Dec. 16, 2007.
Chen, L.H., et al., "Control of carbon nanotube morphology by change of applied bias field during growth", Applied Physics Letters, vol. 85, No. 22, Nov. 29, 2004.
Cui, Li-Feng, et al., Crystalline-Amorphous Core-Shell Silicon Nanowires . . . : Nano Letters, Jan. 14, 2009.
Cui, Yi, et al., "Nanowire Lithium-Ion Batteries as Electrochemical Energy Storage for Electric Vehicles", Jun. 1, 2009.
Eom, J. Y., et al., "Electrochemical Insertion of Lithium into Multiwalled Carbon Nanotube/Silicon Composites Produced by Ballmilling", J. of the Electrochemical Soc., 2006.
Hossain, Sohrab, et al., "Carbon Fiber Composite—A High Capacity Anode for Lithium-ion Batteries", LiTech, LLC, Oct. 7-12, 2007.
International Search Report and Written Opinion, PCT/US2009/035195, Rojeski, Ronald Anthony, May 5, 2009.
Kim, Nyung-Hoon, et al., "Electrochemical characteristics of Si/Mo multilayer anode for Li-ion batteries", Rev. Mex. F'is. S 53(1) (2007) 17-20.
Liangbing, Hu, et al., "Thin, Flexible Secondary Li-Ion Paper Batteries", Department of Materials Science and Engineering, Stanford University, Stanford, California 94305, pp. A-F.
Lu, Chenguang, et al., "Controlling the Diameter of Carbon Nanotubes in Chemical Vapor Deposition Method by Carbon Feeding", J. Phys. Chem. B 2006, 110, 20254-20257.
MIT, "Nanoscientists Fired Up about Battery Alternative", Nanotechnology, Feb. 8, 2006.
Patel, Prachi, Nanowire Advance for Lithium Batteries, NicerNews, Aug. 14, 2009, http://www.technologyreview.com.
Redden, Chris, "Nanowire Formation in Anodic Alumina Templates", pp. 1-13, Shelby Hall Room 151, 12:45pm, Nov. 11, 2008.
Sharma, Kal Renganathan, "Control of Diameter during Cnt Synthesis in the Three Methods", 2007.
Signorelli, Riccardo, et al., "Carbon Nanotube Enhanced Ultracapacitor", MIT Laboratory for Electromagnetic and Electronic Systems, Dec. 2005.
Silicon Nanotubes Outperform Carbon Nanotubes for Hydrogen Storage, Apr. 20, 2008.
Tarascon, J. M. "Towards the Next Generation of Li-ion Batteries Based on Nanomaterials", Apr. 3, 2006.
Yao, Yagang, et al., "Temperature-mediated growth of single-walled carbon-nanotube intramolecular juncitons," Nature Materials, vol. 6, Apr. 2007.
U.S. Appl. No. 12/392,525, filed Feb. 25, 2009, Rojeski, High Capacity Electrodes.
U.S. Appl. No. 13/670,235 Non-Final Office Action, issued Mar. 4, 2013.
U.S. Appl. No. 13/670,208 Non-Final Office Action, issued May 10, 2013.

* cited by examiner

ELECTRODES INCLUDING SUPPORT FILAMENT WITH COLLAR STOP

CROSS REFERENCE TO RELATED APPLICATIONS

This application claims benefit and priority to U.S. Provisional Patent Application Ser. No. 61/254,090 filed Oct. 22, 2009 and entitled Electrodes Including Collar Stop; and this application is a continuation-in-part of U.S. patent application Ser. No. 12/392,525 filed Feb. 25, 2009 now U.S. Pat. No. 8,420,258 and entitled "High Capacity Electrodes," which in turn claims priority of and benefit to U.S. Provisional Patent Applications 61/067,018 filed Feb. 25, 2008 and 61/130,679 filed Jun. 2, 2008. All the above provisional and non-provisional patent applications above are hereby incorporated herein by reference.

BACKGROUND

Field of the Invention

The invention is in the field of electrode technology.

SUMMARY

Various embodiments of the invention include an electrode comprising a substrate; a support filament coupled to the substrate; an intercalation layer including a donor acceptor material configured to receive a reactant of an electrochemical reaction (e.g., an ion, an electron, a charge donor and/or a charge acceptor), the donor acceptor material be disposed along the length of the support filament; and a region of the intercalation layer proximate to the substrate and including a lower amount of donor acceptor material relative to a region of the intercalation layer distal to the substrate.

Various embodiments of the invention include a method of producing an electrode, the method comprising receiving a substrate; growing a first region of the support filament, coupled to the substrate; growing a collar stop at the end of the first region of the support filament distal to the substrate, the collar stop being configured to reduce an amount of donor acceptor material that reaches the first region; growing a second region of the support filament from the collar stop, the second region of the collar stop having a smaller diameter than the collar stop; and applying donor acceptor material to the support filament such that a greater thickness of donor acceptor material is deposited in the second region of the support filament relative to the first region of the support filament.

Various embodiments of the invention include a battery comprising a first electrode; and a second electrode comprising a substrate, a support filament coupled to the substrate, an intercalation layer configured to receive a reactant of an electrochemical reaction, the intercalation layer being disposed on the support filament, and means for creating a region of the intercalation layer proximate to the substrate that includes a lower amount of donor acceptor material relative to a region of the intercalation layer distal to the substrate.

DETAILED DESCRIPTION

Figure 1:
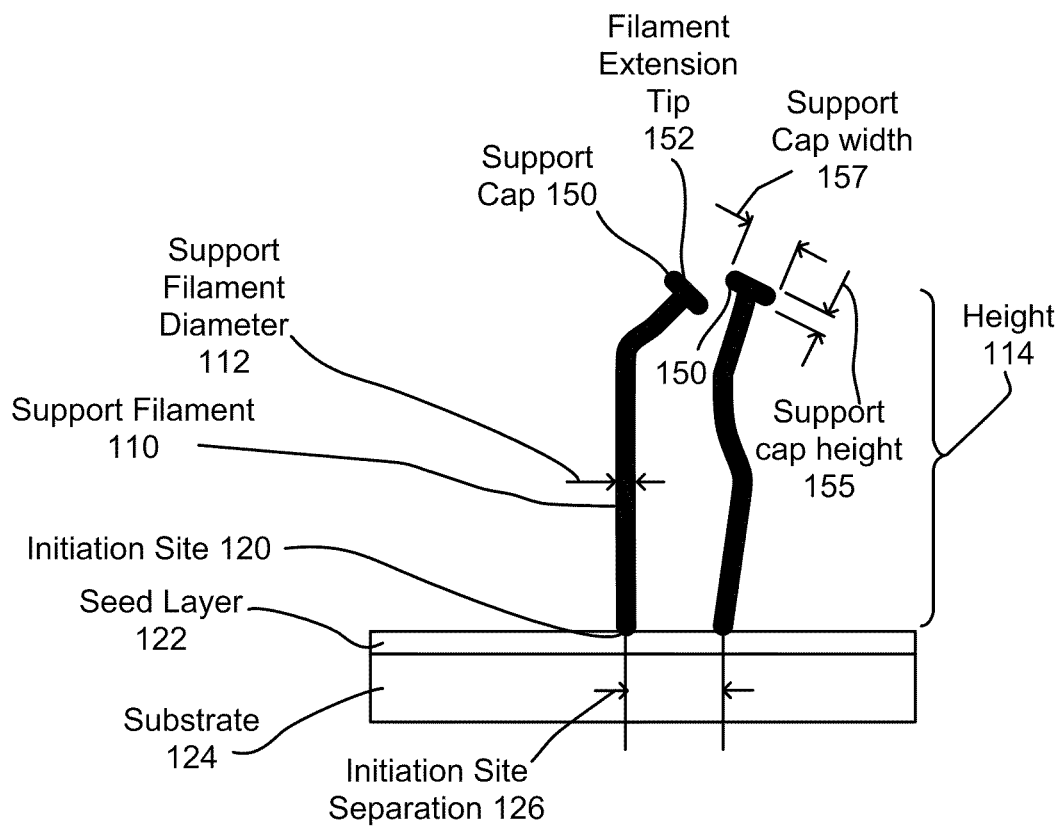
FIG. 1 illustrates a support cap electrode design, according to various embodiments of the invention.

FIG. 1 illustrates an electrode comprising a support filament 110. The support filament 110 includes a support cap 150. The support cap 150 is optionally an extension of the support filament 110 and has a support cap width 157 approximately 1%, 2.5%, 10%, 25%, 40%, or up to 60% larger than a support filament diameter 112. A support filament height 114 includes a support cap height 155. In some embodiments, the support cap height 155 is at least 250 nanometers, 500 nanometers, 2000 nanometers, or 5000 nanometers. In other embodiments, the support cap height 155 is at least 1, 5, 20, 30, or 50 percent of filament height 114. The support cap width 157 can be at least 1, 5, 15, 40 or 75 percent of an initiation site separation distance 126. Initiation sites are places on a seed layer 122 at which the growth of support filament is initiated. The cross-sectional shape of the support cap 150 (as viewed in FIG. 1) can be rectangular, triangular, squares, circular, or diamond shaped. Other shapes are possible. Support cap 150 is configured to prevent an intercalation layer 750 (FIG. 7) from sliding off of the unattached end of support filament 110.

The support filament 110 can be a carbon nano-tube (CNT), a carbon nano-fiber (CNF), or a nano-wire (NW), or other nano-scale structure. The material comprising the CNTs is generally carbon, and can include other materials, such a metals, semiconductors, and insulators that are carried in the feedstock gas during growth of the CNTs. Additionally, the CNTs can be single-walled or multi-walled. The material comprising CNFs is generally carbon, and can include other materials, such as metals, semiconductors, and insulators, that can be carried in the feedstock gas during growth of the CNFs. CNTs are generally described as having a diameter of at least 2 nm, 5 nm, 10 nm, 30 nm or 50 nm. CNFs are generally described as having a diameter of at least 30 nm, 50 nm, 150 nm, 250 nm, 500 nm or 750 nm. Nanowires (NW)

can be comprised of metals (such as gold, copper or tin) or semiconductors (such as silicon, germanium, InP, GaN, GaP, ZnO.), or oxides, such as $MnO_2$, indium tin oxide, ZnO, $SnO_2$, $Fe_2O_3$, $In_2O_3$ or $Ga_2O_3$. Other materials are possible.

Figure 2:
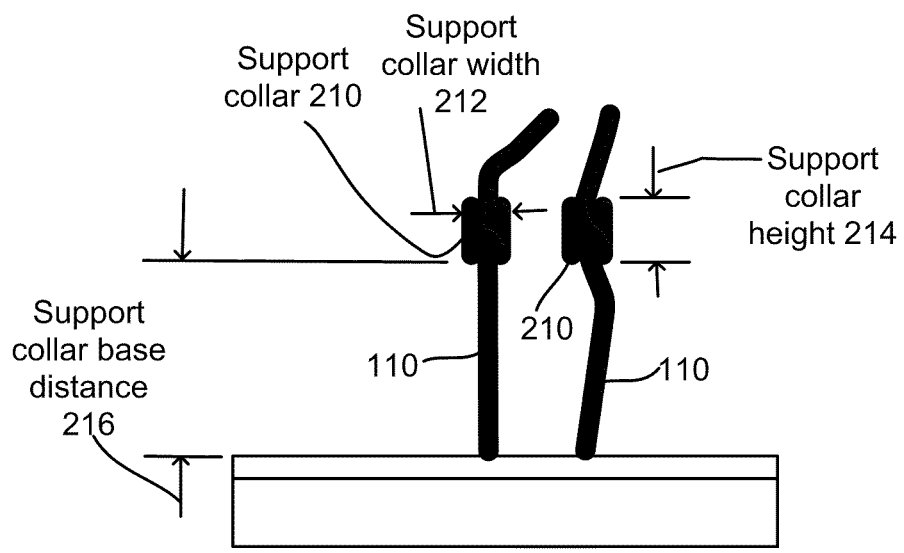
FIG. 2 illustrates a support collar electrode design, according to various embodiments of the invention.

FIG. 2 illustrates an electrode comprising support filament 110 including a support collar 210. The support collar 210 is optionally an extension of the support filament 110 that has a diameter of at least 1%, 2.5%, 10%, 25%, 40% or 60% larger than a support filament diameter 112. In some embodiments the support collar height 214 is at least 100, 250, 500, 2000 or 5000 nanometers, possibly larger, and can be as small as 50 nanometers, possibly smaller. In some embodiments the support collar height 214 is at least 1, 5, 15, 40 or 75 percent of the support filament height 114. The support collar width 212 can be at least 1%, 5%, 15%, 40% or 75% of the initiation site separation distance 126. The shape of the support collar 210 can be rectangular, squares, circular, triangular, round, diamond shaped, curved, or the like. Other shapes are possible. The support collar base distance 216 is optionally at least half the support filament height 114. It is also possible that the collar base distance 216 is 10%, 30%, or 75% of the support filament height 114. The base distance 216 can extend at least 500, 1000, 2500, 5000 or 12500 nanometers from the initiation site 120. Additionally, it is possible for the base distance 216 to end within several microns of the filament extension tip 152.

Figure 3:
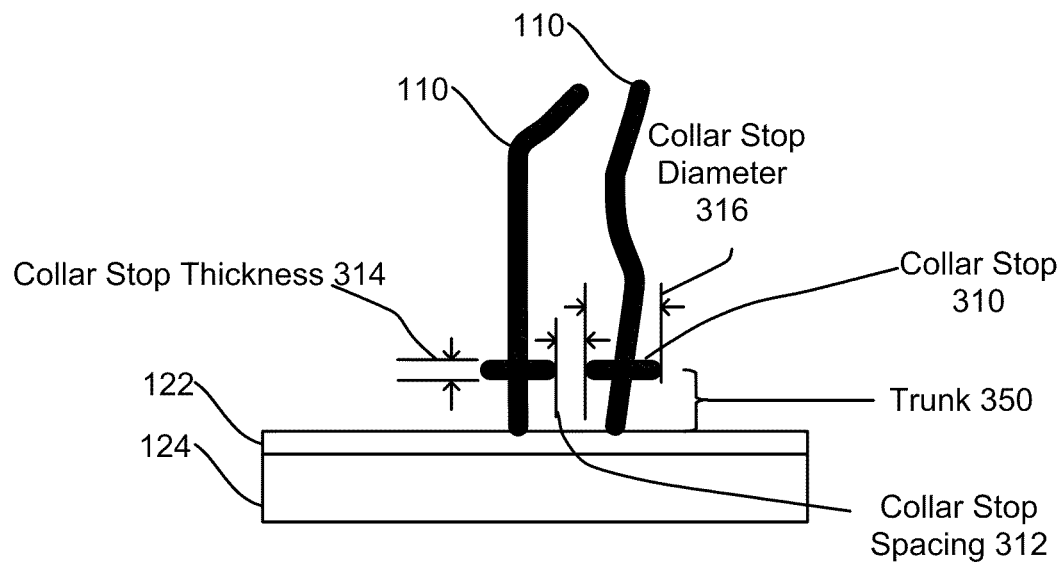
FIG. 3 illustrates a collar stop electrode design, according to various embodiments of the invention.

FIG. 3 illustrates an electrode comprising support filament 110 including a collar stop 310. The collar stop 310 is a region of the support filament 110 characterized by a diameter greater than other regions of support filament 110. In some embodiments, the diameter of the collar stop 310 is at least 1, 2.5, 10, 25, 40 or 60 percent larger than the diameter of the support filament 110 in one or more other regions of support filament 110 (e.g., support filament diameter 112). The diameter of the collar stop 310 and the collar stop spacing 312 is controlled to create a trunk 350. This trunk 350 will result in a region of reduced Donor Acceptor Material (DAM). A DAM reduced region is a region in which there is a reduced amount of intercalation material relative to other areas of support filament, but not necessarily a complete lack of intercalation material. For example, in various embodiments, a DAM region may include less than 75, 50, 25, 10 or 5 percent (by weight per unit area of support filament 110) of the intercalation material relative to other areas of support filament 110. (For the purposes of description, the intercalation material is defined as a material that either donates or accepts charge to complete an external circuit of the electrode. The intercalation material is configured to exchange charge carriers, charge donors and/or charge receivers with a surrounding electrolyte. The intercalation material is optionally porous to these species.) The collar stop spacing 312 can be approximately zero, or at least 10, 50, 75 or 95 percent of the distance between initiation sites 126. The collar stop 310 can be grown anywhere along the length of the support filament 110, for example, in some embodiments the collar stop 310 can be disposed within 10,000, 5000, 2000, 1000, 750, 250, 100, 25 or 5 nanometers of the initiation site 120.

The methods of creating the collar stop 310 are generally similar to those of creating the support collar 210 or support cap 150. The methods to control diameter of the support collar 210, the support cap 150, and/or the collar stop 310 can include varying the temperature of the feedstock gas, substrate, or reaction chamber (or a combination of the three), or varying the flow rates of various feedstock gases. For example, changing the composition of the feedstock gas during growth of the support filament 110 can also control these diameters. Another method to control diameter of the support filament 110, collar stop 310, support collar 210, and/or support cap 150 is to apply a static or dynamic electric field, to apply a static or dynamic magnetic field, or to apply a combination of the electric and magnetic fields. Other methods to control these diameters will be apparent to those of ordinary skill in the art.

The collar stop 310, support collar 210, and support cap 150 is optionally of the same material as the support filament 110, but other materials or ratios thereof may be used, depending on the particular process implemented. For instance, different feedstock gases can be used at different process times, such as substituting methane with acetylene, ethylene, or ethanol (in the case of CNT/CNF growth). Additionally, different process gases can be used at different times. For instance, argon can be substituted for a process gas such as ammonia, nitrogen or hydrogen. Different mixes of the gases can be used depending on the desired effect. Those skilled in the art of CNT/CNF growth can appreciate that other feedstock gases and process gases can be used.

The collar stop thickness 314 generally will be less than several microns but can be as much as 1, 5, 10, 26, 50 or 75 percent of the support filament height 114. In some embodiments the collar stop thickness 314 is less than 40, 20, 5, 2 or 0.25 percent of the support filament height 114. The cross section of the collar stop 310, as viewed in the plane of FIG. 3, can have an oval shape, a diamond shape, or a square shape, depending on the growth rates of the support filament 110. Other cross section shapes are possible. These shapes and dimensions are optionally had by the support cap 150 and support collar 210, as well as the collar stop 310.

The collar stop diameter 316 is controlled by the process method chosen to create the collar stop 310. For instance, during growth of the collar stop 310, the temperature of the reaction chamber can be varied to slow or speed the reaction that creates the support filament 110, thus creating regions where the diameter of the support filament 110 is larger the than other regions of support filament 110. For example, the support filament 110 may include regions of narrower diameter separated by the collar stop 310 having a relatively larger diameter. Alternatively, the support filament may include a region of relatively larger diameter between a substrate 124 and the collar stop 310 (the collar stop 310 may be of lesser or approximately the same diameter relative to this region), and a region of smaller diameter distal to the substrate 124. The support filament diameter 112 is defined as the smallest diameter along support filament.

The collar stop spacing 312 is controlled by the initiation site separation 126 and the collar stop diameter 316. Dimensions of the collar stop 310 are selected such that reduced attachment of DAM occurs between the collar stop 310 and substrate 124, relative to the region of support filament 110 distal to substrate 124. A single support filament 110 may include more than one collar stop 310 and/or more than one support collar 210.

In the embodiment illustrated, the trunk 350 is a region that will be substantially free of DAM material or have a reduced amount of DAM material relative to that part of support filament 110 that is above (distal to substrate 124) collar stop 310. This is accomplished by appropriate choice of collar stop diameter 316 and collar stop spacing 312. For instance, the collar stop spacing 312 and collar stop diameter 316 can be chosen such that a particular collar stop 310 barely touches its nearest collar stop neighbor, effectively creating a collar stop spacing 312 equal to zero. Alternatively, the collar stop spacing 312 could be greater than zero. The collar stop 310 forms a barrier that reduces the amount of DAM that reaches the region of the support filament 110 between the collar stop 310 and the substrate 124, relative to other parts of the support filament 110.

Figure 4:
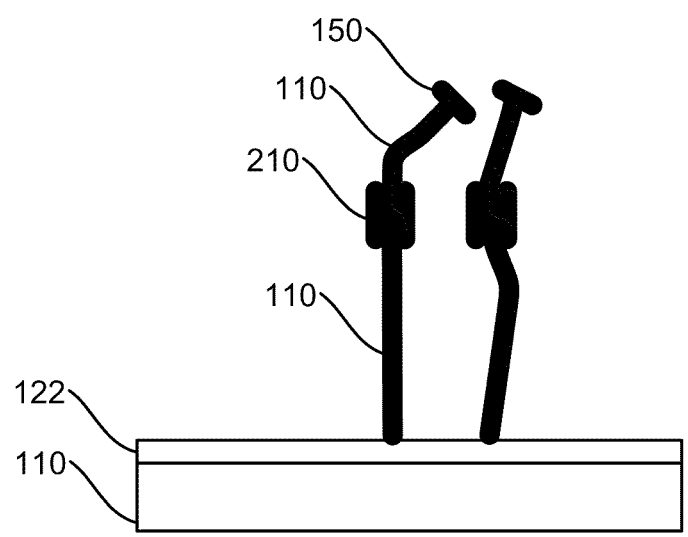
FIG. 4 illustrates a support cap and support collar electrode design, according to various embodiments of the invention.

FIG. 4 illustrates various embodiments of the invention in which the support filament 110 has a support cap 150 and support collar 210, but no collar stop 310.

Figure 5:
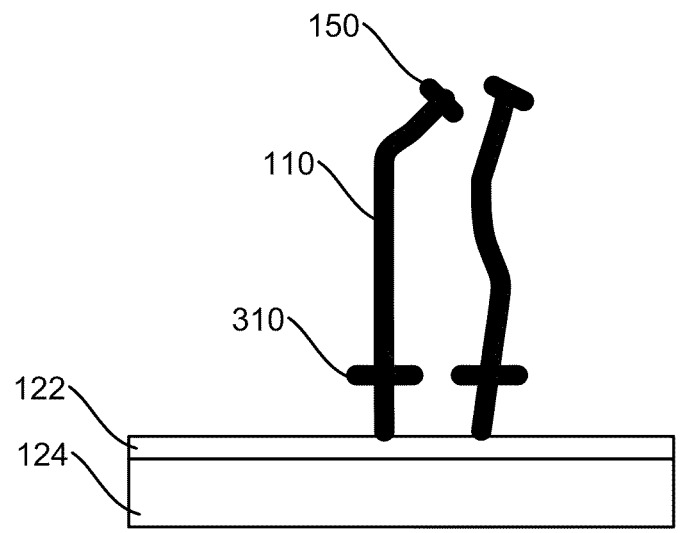
FIG. 5 illustrates a support cap and collar stop electrode design, according to various embodiments of the invention.

FIG. 5 illustrates various embodiments of the invention in which the support filament 110 has a support cap 150 and collar stop 310, but no support collar 210.

Figure 6:
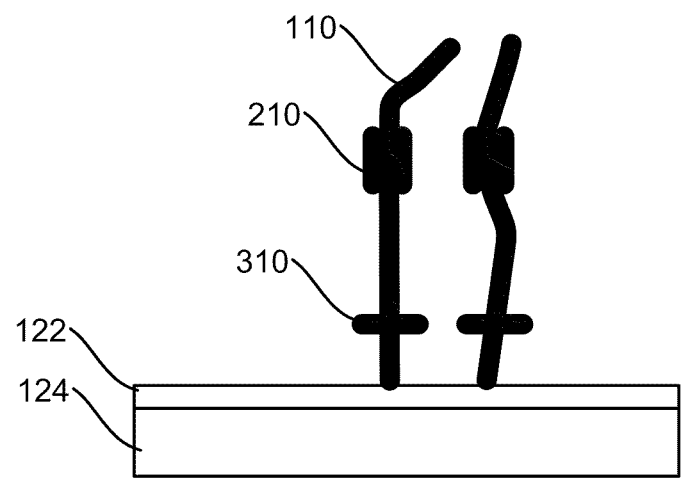
FIG. 6 illustrates a support collar and collar stop electrode design, according to various embodiments of the invention.

FIG. 6 illustrates various embodiments of the invention in which the support filament 110 has a support collar 210, and a collar stop 310, but no support cap 150. FIGS. 4-6 illustrate that any combination of support cap 150, support collar 210 and collar stop 310 can be included on a support filament 110. These combinations can include one, two, three or more of these elements. A single support filament 110 can include more than one collar stop 310 and/or more than one support collar 210. The positions of support collar 210 and collar stop 310 can be varied up and down the length of support filament 110 relative to the positions illustrated in the figures. Collar stop 310 and support collar 210 are typically cylindrically symmetric around the long axis of support filament 110.

Figure 7A:
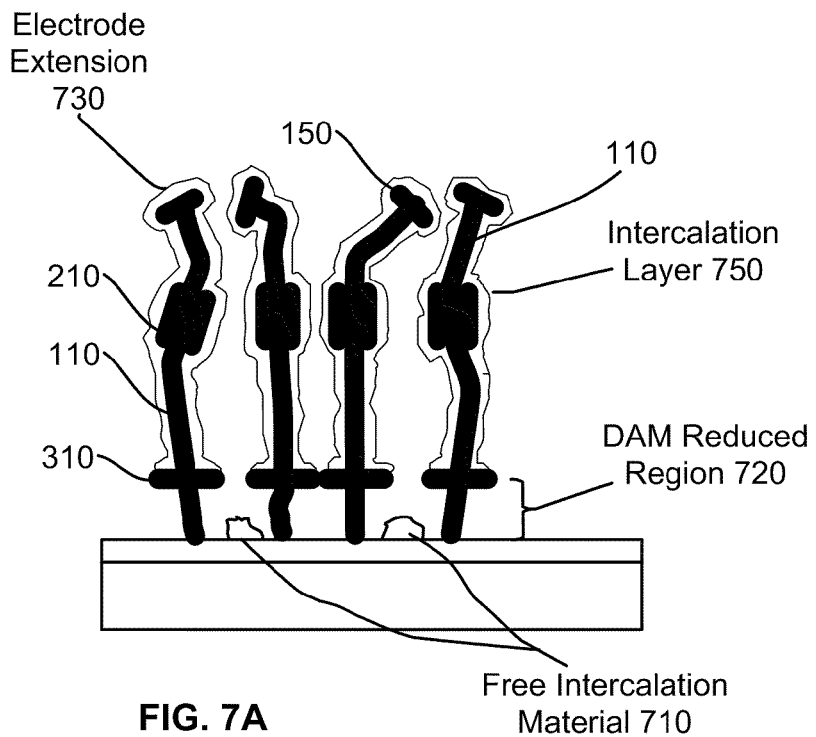
FIGS. 7A, 7B and 7C illustrate electrodes including intercalation material, according to various embodiments of the invention.

FIG. 7A illustrates a collar stop 310, a support cap 150, a support collar 210, and an intercalation layer 750 comprising DAM. This illustration graphically represents the basic function on the collar stop 310, e.g., the intercalation layer 750 is substantially deposited/grown on the upper part of support filament 110 between support cap 150 and collar stop 310, but not (or less so) on the region below the collar stop 310, thus creating a DAM reduced region 720 that is relatively or substantially free of intercalation material. By appropriate choice of collar stop diameter 316, and collar stop spacing 312, a mask is created such that minimal (or less) intercalation material reaches the substrate 124.

The DAM reduced region 720 is the region of the support filament 110 that is shielded from deposition of the intercalation layer 750. Typically, the DAM reduced region 720 is adjacent to seed layer 122.

FIG. 7A also demonstrates the utility of the support cap 150 and support collar 210. Both support cap 150 and support collar 210 are characterized by diameters that are greater than diameters 112 of other parts of the support filament 110. Given that the intercalation layer 750 expands during the operation of the electrode, in some embodiments the intercalation layer will separate from the diameter of the support filament 110. In these embodiments, as long as the diameter of the support collar width 212 and/or support cap width 157 is larger than the interior diameter of the expanded intercalation material, the intercalation layer 750 will be mechanically tethered to the support filament 110, thus insuring that the intercalation material will not separate from the support filament 110.

Collar stop 310 and support collar 210 are optionally similar in size and/or shape. One difference between collar stop 310 and support collar 210 is that a support collar 210 is disposed on support filament 110 in a position (and otherwise configured) such that it supports the attachment of intercalation layer 750 to support filament 110. For example, support collar 210 is configured to prevent intercalation layer 750 from sliding off of the unattached end of support filament 110. In contrast, collar stop 310 is disposed (and otherwise configured) on support filament 110 in a position such that it causes a region of reduced intercalation layer 750 in the region of support filament 110 between the collar stop 310 and substrate 124, relative to other parts of support filament 110. To a lesser degree a support collar 210 may also result in a region of somewhat reduced intercalation layer 750.

Figure 7B:
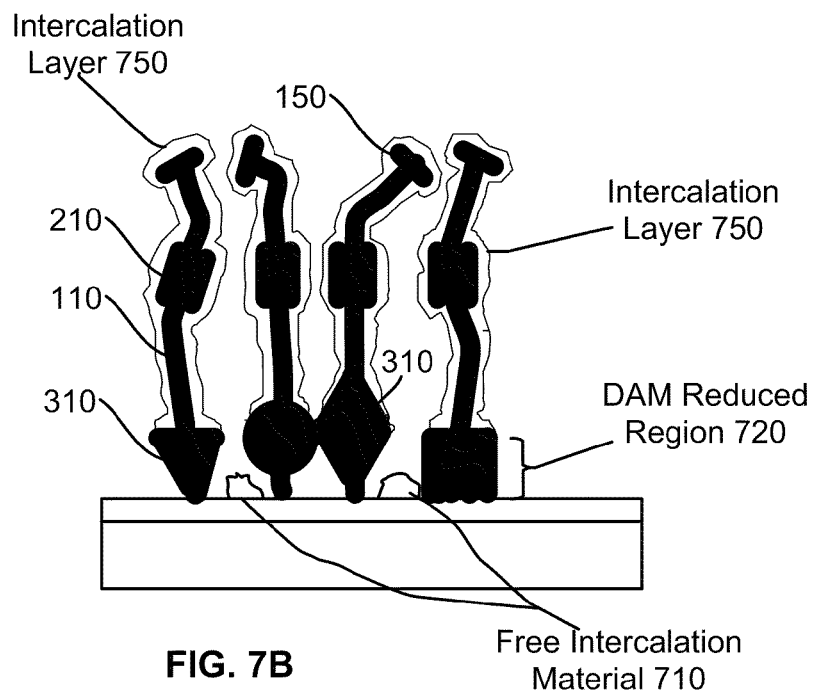

Free intercalation material 710 is material that is not stopped by the collar stop 310 during deposition/growth of the intercalation layer 750. The material source for deposition/growth of the intercalation layer 750 is viewed as generally coming from above the support filament 110 (top of the page), as illustrated in FIGS. 7A-7C.

Figure 7C:
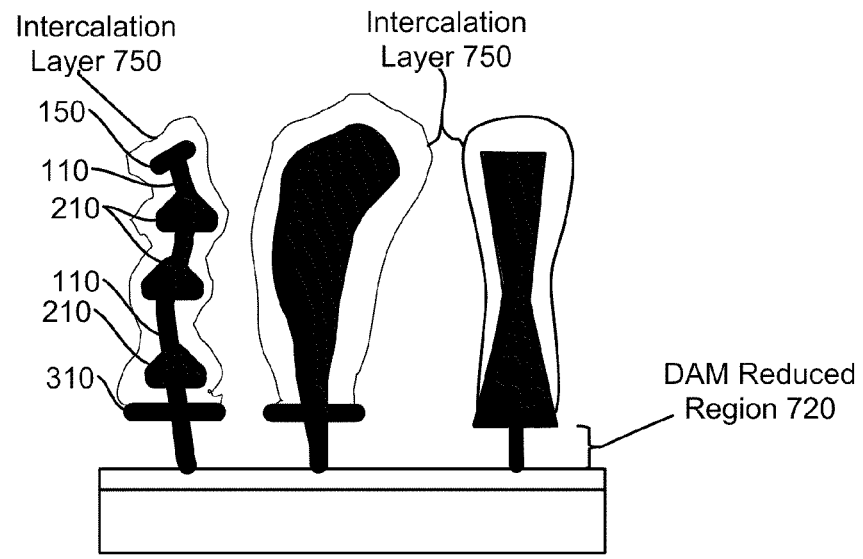

FIG. 7C illustrates alternative embodiments of support filament 110. These embodiments include an example of support filament having more than one support collar and a tapered shape. The various different examples of support filament 110 illustrated in FIGS. 7B and 7C are not normally found on the same electrode. An electrode normally includes one type of support filament 110, support collar 210, support cap 150, and collar stop 310 because all the support filaments are generated together. The variations illustrated herein are for the purposes of example only. The thickness of the intercalation layer 750 illustrated in FIGS. 7A-7C is also for illustrative purposes only. In typically embodiments the intercalation layer 750 is substantially thicker then the support filament 110. The thickness of the intercalation layer 750 will also change as charged species are adsorbed and desorbed. Note also that the intercalation layer 750 thicknesses described herein refer to a condition where no charged species have been adsorbed or desorbed by the intercalation layer 750.

Figure 8:
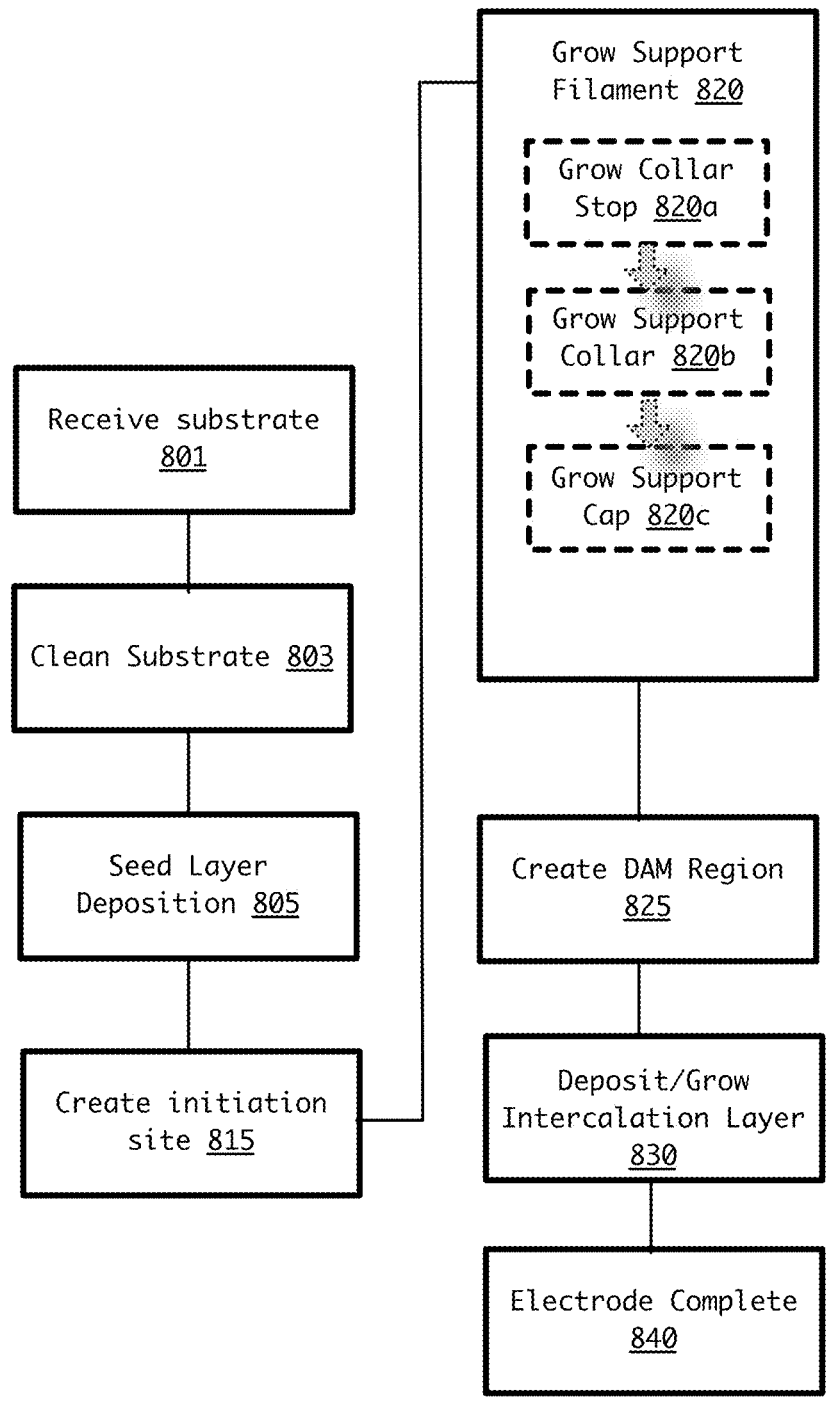
FIG. 8 illustrates a method of creating electrode extensions, according to various embodiments of the invention.

FIG. 8 illustrates a method for fabricating a support filament with an intercalation layer 750. The first step 801 is to receive a substrate 124. Substrate 124 is optionally copper, in the case of an anode, or aluminum, in the case of a cathode. The substrate can be of other materials, depending on the desired application. For instance, stainless steel or graphite can be used for a substrate. Those skilled in the art of battery design can further specify other materials, depending on the desired application.

An optional second step 803 is to clean the substrate. The purpose of cleaning 803 the substrate is to prepare the substrate for the subsequent depositions and growth of materials in later process steps. It is meant to remove any organics, oxides, and other contaminates present on the current collector. The methods to clean the substrate can range from physical (using an abrasive, for instance, to remove a thin layer of material that has been exposed to contaminants), to chemical (using a solvent, such as acetone, iso-propanol, TCE, or methanol) and/or chemical etch (citric acid soak/rinse, which dissolves part of the actual substrate, in the case of copper), or any combination of physical and chemical methods to appropriately prepare the surface for subsequent process steps.

A third step 805 is an optional seed layer deposition. Seed layer deposition 805 is the process step where the base layer, or seed layer 122, for support filament 110 growth is created. This process step can be implemented through a gas phase (physical or chemical) deposition/growth, a liquid phase deposition/growth, or a solid phase deposition/growth, or any combination thereof.

Physical gas phase deposition techniques (where the material to be deposited is transported from the source to the substrate in the gas phase) can include: thermal evaporation, electron beam evaporation, DC sputtering, DC magnetron sputtering, RF sputtering, pulsed laser deposition, cathode arc deposition, and/or the like. It is also possible to use reactive physical vapor deposition, a method by which a 'contaminate gas' is injected into the chamber during the growth process, thereby incorporating itself into the layer as it grows.

Chemical gas phase deposition techniques (where chemical precursors are transported to the surface in the gas phase, and then subsequently undergo a chemical reaction at the surface) can include Low Pressure Chemical Vapor Deposition, Plasma-Enhanced Chemical Vapor Deposition, Atmospheric Pressure Chemical Vapor Deposition, Metal-Organic Chemical Vapor Deposition, Hot-wire Chemical Vapor Deposition, Very High Frequency Plasma Enhanced Chemical Vapor Deposition, Microwave Plasma Enhanced Chemical Vapor Deposition, and/or the like.

Liquid phase deposition techniques to create the seed layer 122 can include plating, electroplating, or chemical solution deposition, etc. Solid phase deposition techniques can include focused ion beam deposition. Another possibility for deposition is a solution that contains a liquid and a suspension of appropriate sized particles that are sprayed onto the current collector, and then the substrate is subsequently 'cured' such that the carrier solution is removed, leaving the particles intact on the surface of the substrate.

Any combination of the above process steps can be used to create an appropriate seed layer 122 for creating the initiation sites for the support filament 110 growth.

A forth step 815 in the process is the creation of the initiation sites. This step is dependent on methods chosen to create the seed layer 122. For instance, the initiation sites separation distance 126 can be determined by the thickness and materials chosen for seed layer deposition 805. For instance, a seed layer of 3000 angstroms nickel/300 angstroms chrome will produce a certain number of initiation sites per square centimeter. If the thickness of the nickel is reduced to 2000 angstroms, the number of initiation sites per square centimeter will be different than that for a thickness of 3000 angstroms nickel. If another material is chosen, such as iron to replace nickel, the resultant initiation sites per square centimeter will also be different. Step 815 is optionally part of step 805.

A solid phase deposition technique can allow for control of the initiation sites per square centimeter. This can be a focused ion beam deposition, where the initiation sites/cm$^2$ are directly controlled by the by where the focused ion beam deposits it material, or a nano-particle suspension, where the initiation sites/cm$^2$ is controlled by the number of nano-particles contained in a given suspension volume. The number of initiation sites can also be controlled by the size of the focused ion beam deposition site, or the size of the nano-particles in solution, etc.

The initiation sites are typically created when a reactor in which the electrode is produced reaches the appropriate reaction temperature with the appropriate feedstock gases flowing, and the feedstock gas begins to catalyze with the seed layer 122. The initiation sites have thus been created, and the support filament 110 growth has commenced.

A fifth step 820 is to grow the support filament 110. There are a number of growth processes available to grow the support filament 110. For example, chemical Vapor Deposition, Thermal Chemical Vapor Deposition, Vapor-Liquid-Solid growth (a type of CVD), and Plasma Enhanced Chemical Vapor Deposition, are processes by which Carbon Nano-Tube (CNT), Carbon Nano-Fiber (CNF), and Nano-Wire (NW) growth has been achieved. Those skilled in the art of filament growth will recognize that there are other growth methods available.

Examples of feedstock gases that can be used to grow CNT/CNF are carbon monoxide, methane, ethane, ethylene, acetylene, and/or the like. It is also possible to use other hydrocarbons or inorganic compounds for the growth process.

Of interest is the Plasma Enhanced Chemical Vapor Deposition (CVD) method, due to the fact that the growth of the support filament 110 aligns with the electric field of the plasma, thus allowing for the production of vertically aligned support filaments 110. Thermal CVD, under certain process conditions, can also produce vertically aligned support filaments 110. Further, Water-Assisted CVD makes possible very high aspect ratio vertically aligned support filaments (length/diameter roughly equal to 1,000,000), allowing for very tall support filaments.

It has also been demonstrated that appropriately modified bacteria and viruses have grown nano-wire structures. Such techniques could be used to create support filament 110.

It is also possible to use several of the techniques together at once, with the appropriate choice of material. For instance, bacteria/viruses can be used to grow the CNT/CNF/NW in the presence of an applied electric field, producing vertically aligned support filaments. Another method of support filament 110 growth is to apply an electric and/or magnetic field during VLS growth to control the trajectory of the growing CNT/CNF/NW, this controlling the three dimensional shape of the support filament 110. Another technique is to begin growth of the CNT/CNF/NW support filament 110 with the reactor operating in PECVD mode; after a specified time, the reactor can be converted to Thermal CVD mode; and then again, after a specified time, the reactor is converted back to PECVD mode. Those skilled in the art of CNT/CNF/NW growth can appreciate that there are other possible combinations that allow for appropriate growth control of the support filament 110.

The height 114 of the support filament 110 is generally determined by the duration of the growth process. The temperature of the reactor, the feedstock gases used, and the combination and strength of applied electric and magnetic fields (or the absence thereof) can influence the speed and amount of filament growth.

The diameter 112 of the support filament 110 is generally determined by the thickness of the seed layer 122, or the size of the nano-particles contained in suspension, if a nano-particle suspension method is chosen to create the seed layer 122, or the size of the ion beam, if focused ion beam deposition is chosen to create the seed layer 122. The temperature of the reactor, the feedstock gases used, and the combination and strength of applied electric and magnetic fields (or the absence thereof) can influence diameter of the support filament 110 as well.

During the growth step 820 of support filament 110, it is possible to implement a sub-step 820a, where the collar stop 310 is grown. This can be accomplished by changing temperature of the reactor, the feedstock gases used and their relative compositions and flow rates, direction and strength of applied electric and magnetic fields (or the absence thereof). The duration of the change implicitly determines the collar stop thickness 314, and collar stop diameter 316. The collar stop spacing is controlled by the duration of change to steady state (and the duration of the change itself) of the aforementioned parameters, as well as by the initiation site separation distance 126. Sub-step 820a can be repeated.

During the growth step 820 of support filament 110, it is possible to implement a sub-step 820b, wherein the support collar 210 is grown; this will occur after step 820a if step 820a occurs. Sub-step 820b is accomplished by changing temperature of the reactor, changing the feedstock gases used and their relative compositions, and changing the combination and strength of applied electric and magnetic fields (or the absence thereof). The diameter, thickness, and height of support collar 210 are largely controlled by the changes in the aforementioned parameters.

During the growth step 820 of support filament 110, it is possible to implement sub-step 820c, where the support cap 150 is grown; this will occur after step 820b, if step 820b occurs. This can be accomplished by changing temperature of the reactor, changing the feedstock gases used and their relative compositions, and changing the combination, direction and strength of applied electric and magnetic fields (or the absence thereof). The diameter, thickness, and height of support cap 150 are optionally controlled by the changes in the aforementioned parameters.

Any of the three steps 820a, 820b, and 820c can be implemented, without regard to the presence or absence of other steps 820a, 820b, and 820c. For instance, step 820a can be executed without step 820b or step 820c. Alternatively, step 820a and 820c can be executed, without executing step 820b, or it can be decided to execute step 820b without executing step 820a or 820c. Additionally, it can be decided to not implement any of the sub-steps 820a, 820b, and 820c, thus creating a support filament 110 that has minimal diameter variation along its length.

The sixth process step 825 is to create the DAM reduced region 720, noting that the DAM reduced region 720 corresponds to the trunk 350. (The reason for the distinction between elements 350 and 720 is that a DAM reduced region 720 is created during deposition of the intercalation layer 750, whereas the trunk 350 is defined in conjunction with the shape of the support filament 110. The trunk 350 will become the DAM reduced region 720 when the intercalation layer 750 is added. Specifically, the trunk 350 is part of the support filament 110, while the DAM reduced region 720 refers to a region in which intercalation material 750 is reduced or absent.) The DAM region creation process step 825 can be accomplished by several methods, including but not limited to the use of collar stop 310. Examples of such methods include controlling the aspect ratio of the support filaments 110 during growth and directional deposition of the intercalation material (such as evaporation or ion-beam deposition). Additional methods include electro-deposition and electro-less deposition at the bottom layer to isolate the trunk 350. It is also possible to perform a sputter/light etch of a masking layer to open the support filament 110 to intercalation layer 750 growth/deposition, or alternatively, the growth parameters of the support filament 110 can be modified to achieve an advantageous aspect ratio (such as a tree like structure). This can be done by changing the composition of the feedstock and process gases used during growth. Another possible method to create the DAM reduced region 720 is to perform a deposition of the intercalation material and directional etch back (reactive-ion-etching, for instance) to free the support filament 110 from coverage by the intercalation layer 750. Creation of the DAM reduced region 720 can be dependent on the methods and structures chosen for the CNT/CNF/NW growth as well as the methods and structures chosen for intercalation layer depositions. For instance, it may be possible that the DAM reduced region 720 is created after the intercalation layer 750 has been deposited, via an appropriate directional etch, such as a reactive-ion-etch or inductively coupled plasma etch, for instance.

The eighth process step 830 is deposit/grow the intercalation layer 750. (Note that DAM refers to the material that donates or accepts ions during the charge and discharge of a battery cell, where an intercalation layer 750 includes a DAM as well as other layers that may provide adhesion, or layers that may provide increased adsorption, or layers that may improve conductivity. Other purposes of the layer(s) are possible. These additional layers can be above or below the deposited DAM.)

The growth of the intercalation layer 750 can be implemented through a gas phase (physical or chemical) deposition/growth, a liquid phase deposition/growth, or a solid phase deposition/growth, or any combination thereof.

Physical gas phase deposition techniques (where the material to be deposited is transported from the source to the substrate in the gas phase) can include: thermal evaporation, electron beam evaporation, DC sputtering, DC magnetron sputtering, RF sputtering, pulsed laser deposition, cathode arc deposition, and/or the like. It is also possible to use reactive physical vapor deposition, a method by which a 'contaminate gas' is injected into the chamber during the growth process, thereby incorporating itself into the layer as it grows.

Chemical gas phase deposition techniques (where chemical precursors are transported to the surface in the gas phase, and then subsequently undergo a chemical reaction at the surface) can include Low Pressure Chemical Vapor Deposition, Plasma-Enhanced Chemical Vapor Deposition, Atmospheric Pressure Chemical Vapor Deposition, Metal-Organic Chemical Vapor Deposition, Hot-wire Chemical Vapor Deposition, Very High Frequency Plasma Enhanced Chemical Vapor Deposition, Microwave Plasma Enhanced Chemical Vapor Deposition, and/or the like.

Note that in any deposition stage more than one material can be deposited at a time. For instance, two (or more) different types of metal can be deposited/grown at the same time, such as tin (Sn) and gold (Au); two (or more) different types of semiconductor can be deposited/grown, such as silicon (Si) and germanium (Ge); two (or more) different types of oxide may be grown/deposited, such as lithium iron phosphate ($LiFePO_4$) and lithium nickel cobalt manganese ($Li(NiCoMn)O_2$). Additionally, it is possible to mix material types, such as a metal and a semiconductor, or a semiconductor and an oxide, or a metal and an oxide, or a metal, semiconductor, and oxide. Examples include silicon (Si) and lithium (Li) co-depositions, silicon (Si) and $LiO_2$ (or $SiO_2$) co-depositions, and silicon (Si), lithium (Li), and $LiO_2$ (or $SiO_2$) co-depositions. It may be desirable to co-deposit insulating material as well, such as silicon dioxide ($SiO_2$), or silicon nitride ($Si_3N_4$). Additionally, it may be desirable to co-deposit carbon (C) as well.

The intercalation layer 750 is optionally created by a liquid phase process, such as electro-less deposition or electro-plating. It is also possible to create the intercalation layer by coating the support filaments with a solution containing the intercalation material (such as silicon (Si) or tin (Sn)), suspended in a binder solvent matrix. After appropriate processing, the solvent is driven out of the matrix, leaving only the binder and intercalation material, thus creating an electrode including support filament 110 and intercalation material. This technique can be applied to the cathode as well. The intercalation layer can include an aerogel. When intercalation layer 750 is generated as a liquid process, DAM reduced region 720 is optionally generated by including in the Trunk 350 a material that repels the liquid. For example, if water is used hydrophobic species can be included in the area of Trunk 350. These species can either be incorporated into support filament 110 or coated on the surface of support filament 110.

In some embodiments, the conductivity of the intercalation layer 750 is controlled by appropriately choosing the deposition and growth technique. For instance, using heavily doped p+ or n+ silicon in the case of sputtering will create a relatively conductive bulk silicon intercalation layer relative to undoped silicon, (e.g., 10's of ohm-cm for highly doped silicon vs. 10000's of ohm-cm for pure silicon). In the case of CVD silicon deposition using silane, adding phosphine or arsine is optionally used to increase conductivity of the deposited/grown silicon. In various embodiments, dopants include boron (B), gallium (Ga), arsenic (As), phosphorus (P), antimony (Sb), indium (In), thallium (Th), and/or bismuth (Bi). Other dopants are possible.

In some embodiments, the conductivity of the intercalation layer 750 is increased by depositing a metal (such as, but not limited to, gold (Au), tin (Sn), silver (Ag), lithium (Li), or aluminum (Al)) while silicon is being deposited/grown. In some embodiments the conductivity of the intercalation layer 750 is controlled via ion-implantation. These methods are also possible with other materials chosen for the intercalation layer 750, such as germanium (Ge). In various embodiments, the resulting resistivity of the intercalation layer 750 is less than 1 ohm-cm, less than 10 ohm-cm, less than 500 ohm-cm, less than 2000 ohm-cm, or less than 12000 ohm-cm. In other embodiments, the resistivity is greater than 12000 ohm-cm.

In some embodiments, step 830 includes post-processing of the deposited intercalation layer 750. This post-processing can change the crystalline structure of the intercalation layer 750. For example, in some embodiments, amorphous silicon is deposited as the intercalation layer 750, and subsequent process steps appropriately anneal the amorphous silicon, thus creating a poly-silicon layer and/or surface on the intercalation layer 750. The resulting structure can include a poly-silicon layer on the outer surface and an amorphous silicon layer between the poly-silicon layer and the support filament 110. Both silicon layers are considered part of intercalation layer 750. This anneal process can be accomplished by using a high-powered laser, or some other fast high temperature thermal source. This method of post annealing after deposition is optionally applied to cathode and/or anode materials.

In some embodiments, the deposited intercalation layer 750 is passivated. In the case of silicon, the passivation can be accomplished by the annealing discussed elsewhere herein, or by deposition of an oxide, nitride and/or carbide layer roughly less than 5, 10, 40, 100 or 250 nanometers. This oxide, carbide or nitride layer is considered part of intercalation layer 750 and can be generated as part of grow support filament step 820. The oxide or nitride can be grown or deposited by thermal means, as well as standard CVD and PECVD techniques. For example, surface passivation is optionally accomplished by growing carbide on the surface of the intercalation layer 750. This growth can be accomplished by executing the step of seed layer deposition 805, creation of initiation sites step 815, and grow support filament step 820, where the carbide, oxide and/or nitride is grown in step 820. In some embodiments, the CNT/CNF/NW heights grown on the intercalation layer 750 is at maximum several microns, and generally less than 250 nm.

By virtue of the shape of the support filament 110, collar stop 310, support collar 210 and support cap 150, different amounts of intercalation material are deposited at different locations along the length of the support filament 110. The deposition/growth methods that are used to create the intercalation layer 750 optionally rely on surface reactions to initiate and continue the growth process. If the flux of reactants to the surface of the support filament 110 is reduced, there will be a corresponding decrease in deposition/growth rate of the intercalation layer 750.

By way of example, and referencing FIGS. 7A-7C, if collar stop spacing 312 is zero, then essentially no or minimal reactants can reach the surface of support filament 110 below the collar stop 310, this producing a DAM reduced region 720 that will have relatively little intercalation layer 750 compared to other parts of support filament 110.

Another way to insure different amounts of deposition/growth intercalation layer 750 along the length of the support filament 110 is to rely on a large aspect ratio of support filament height 114 to initiation site separation 126. This aspect ratio can be on the order of 5:1, 10:1, 100:1, 1000:1, 10000:1, or as much as 1000000:1, possibly greater. Since a larger aspect ratio means that the lateral surface of the support filament has a vanishingly smaller solid angle as reactants move toward the substrate 124, the amount of growth along the support filament correspondingly decreases, thus producing a DAM reduced region 720 that has little or no intercalation layer 750. Collar stop 310 is not required for producing the DAM reduced region 720 in this approach.

At step 840 the electrode fabrication may be complete. The electrode is optionally included within a battery.

Figure 9A:
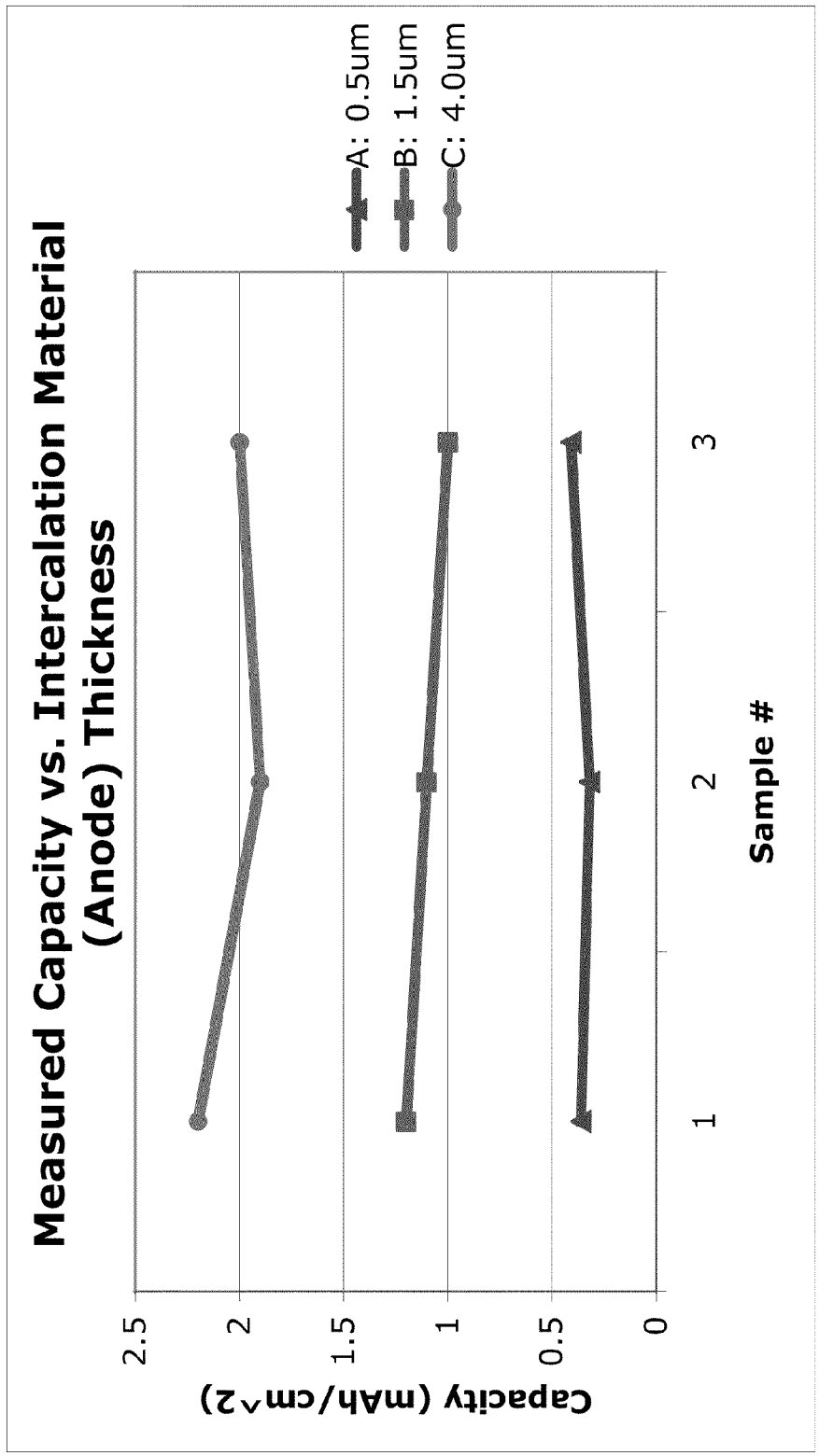
FIG. 9 illustrates measured charge capacity vs. intercalation material thickness, according to various embodiments of the invention.
Figure 9B:
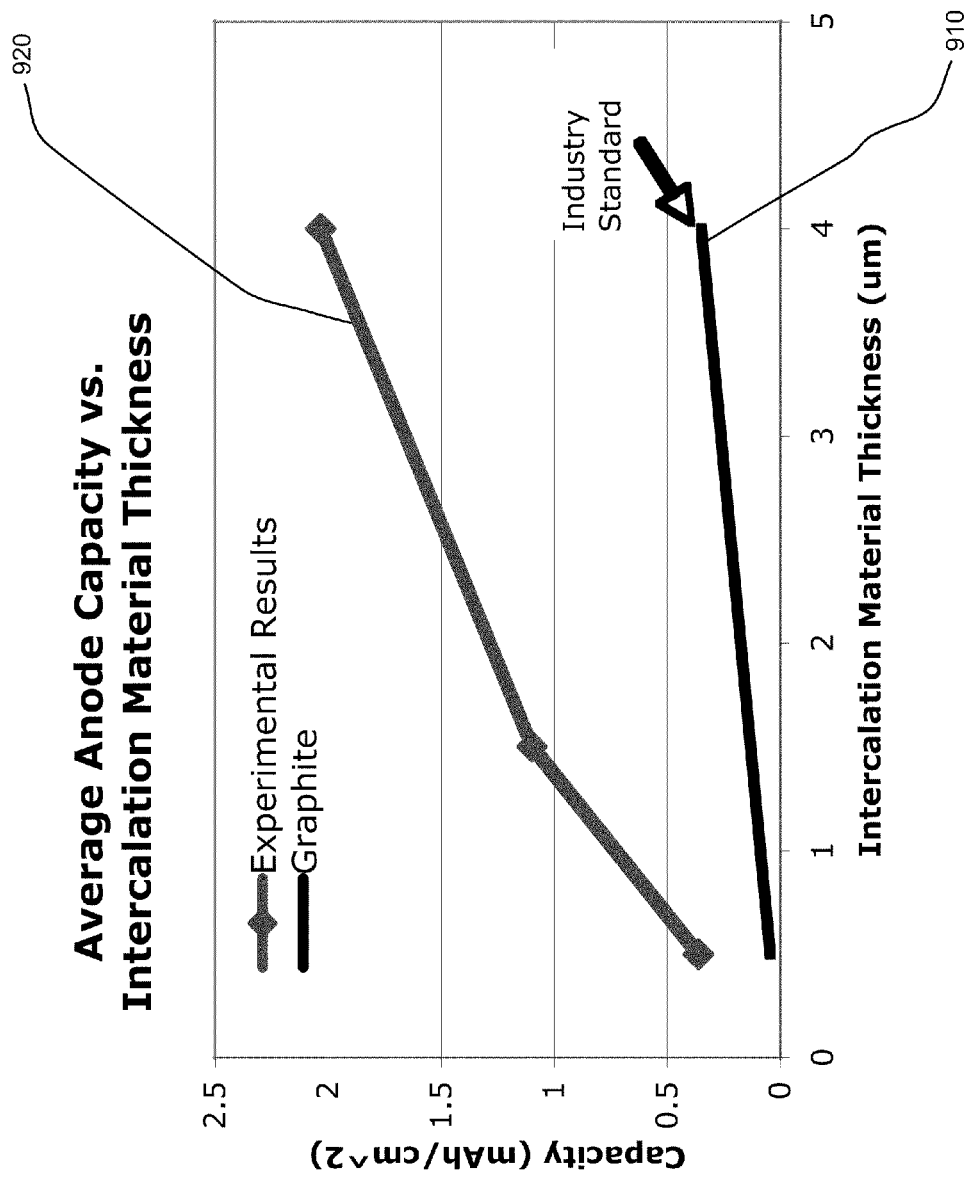

FIGS. 9A and 9B illustrate the measured capacity of anodes created using the processes described herein, where the support filament 110 is a carbon nano-fiber and the intercalation layer 750 is silicon. FIG. 9A illustrates that the capacity of the electrode increases with the thickness of the intercalation layer 750. In FIG. 9B line 910 illustrates a calculated capacity of just a graphite coat and line 920 illustrates an experimental result using a mixture of amorphous and poly-silicon. The measurements were made in a half-cell setup. FIG. 9B illustrates improvements of 5 to 7 times in charge storage capacity when compared to purely graphite-based anodes. They amount of improvement is dependent on the thickness and material type of the intercalation layer 750.

Figure 10:
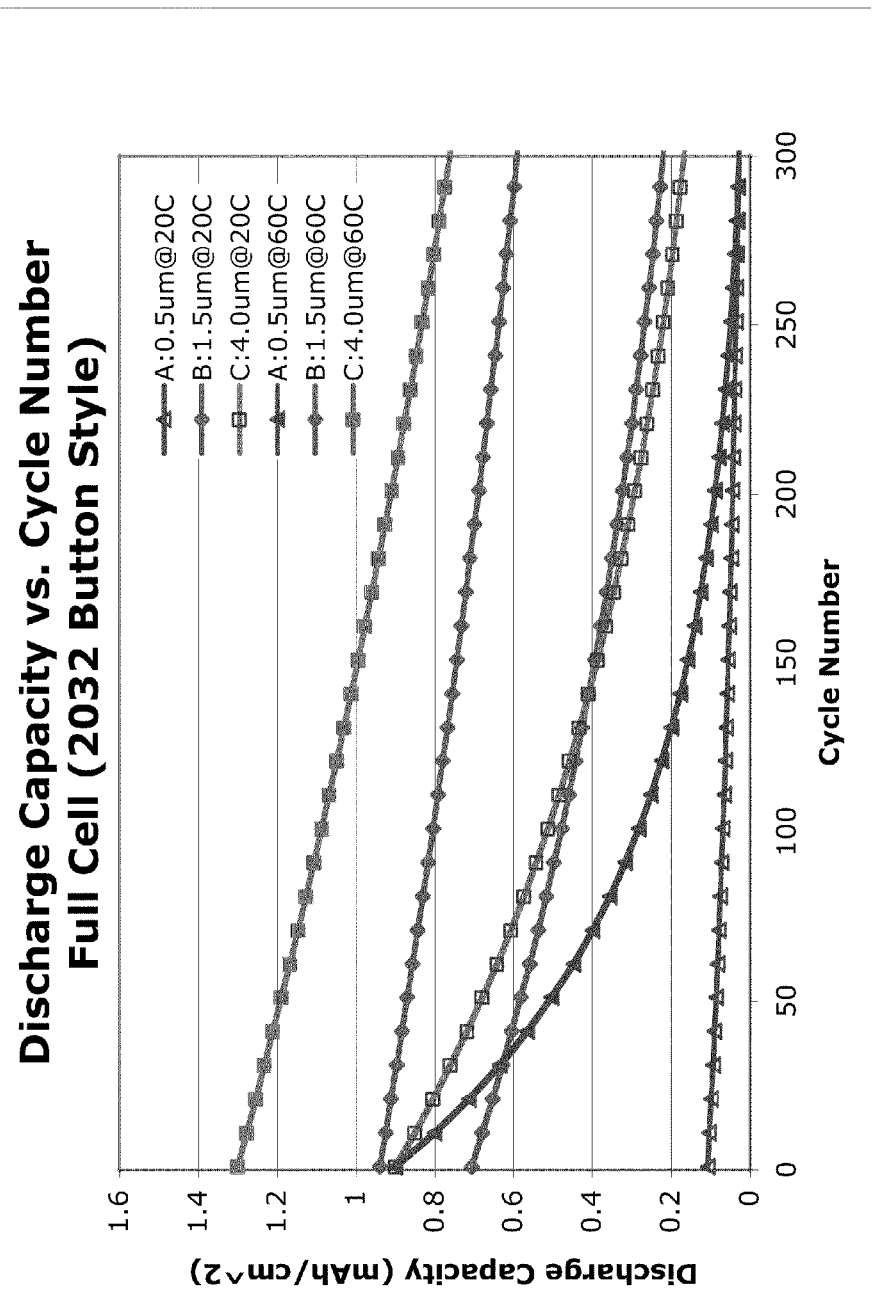
FIG. 10 illustrates battery cycle life vs. temperature and intercalation material thickness, according to various embodiments of the invention.

FIG. 10 illustrates the measured cycle life vs. temperature and thickness of intercalation layer 750 of a battery using anodes created using the processes described herein as compared with an industry standard electrode. The support filament 110 is a carbon nano-fiber and the intercalation layer 750 is silicon. Measurements were made at two different temperatures in a full-cell setup and cycling was performed at C/2 rate. The data demonstrates significantly enhanced cycle life at elevated temperature relative to the prior art.

Figure 11:
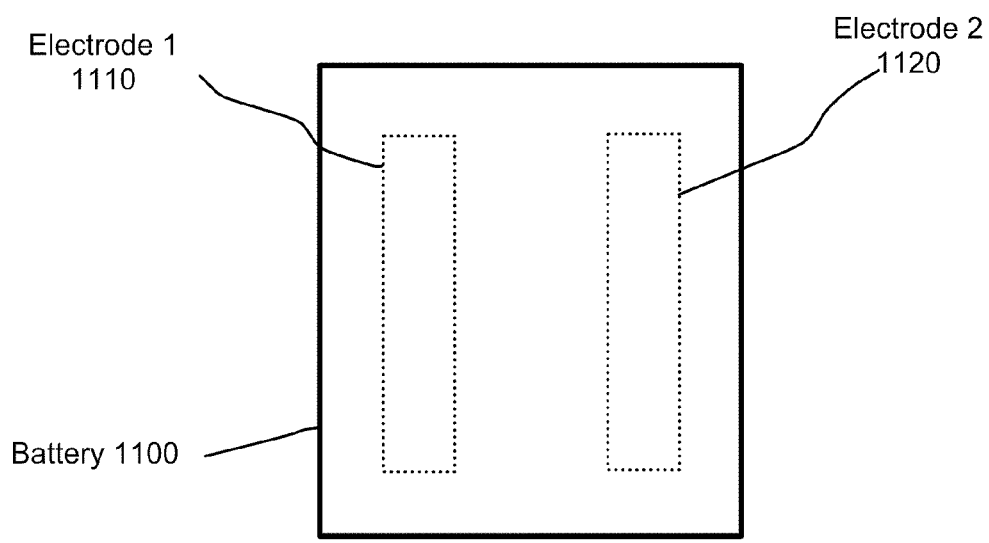
FIG. 11 illustrates a battery, according to various embodiments of the invention.

FIG. 11 illustrates a battery 1100, according to various embodiments of the invention. Battery 1100 includes a first electrode 1110 such as that illustrated in FIGS. 1-8 herein, and a second electrode 1120. The second electrode 1120 may or may not include the features illustrated in FIGS. 1-8. Battery 1100 further includes conductors (not shown) configured to couple the first electrode 1110 and the second electrode 1120 in a circuit configured to supply electrical power to a load. One of ordinary skill in the art will understand how these conductors can be configured. Battery 1100 is typically a rechargeable battery. The first electrode may be configured to operate as an anode or a cathode.

Figure 12A:
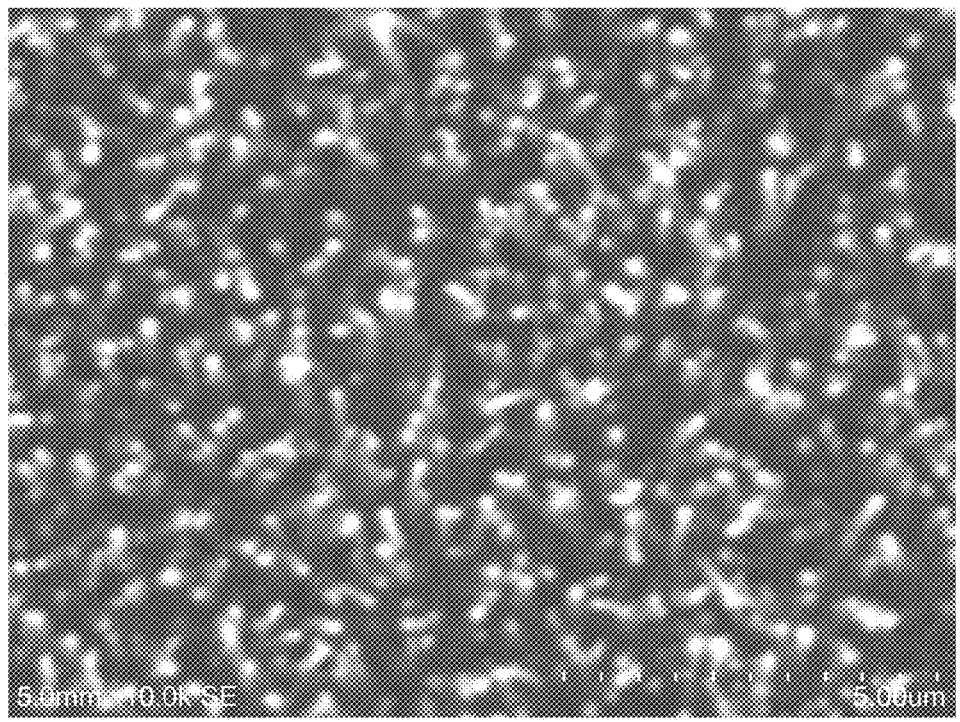
FIGS. 12A and 12B illustrate carbon nano-fibers grown on a copper substrate, according to various embodiments of the invention.
Figure 12B:
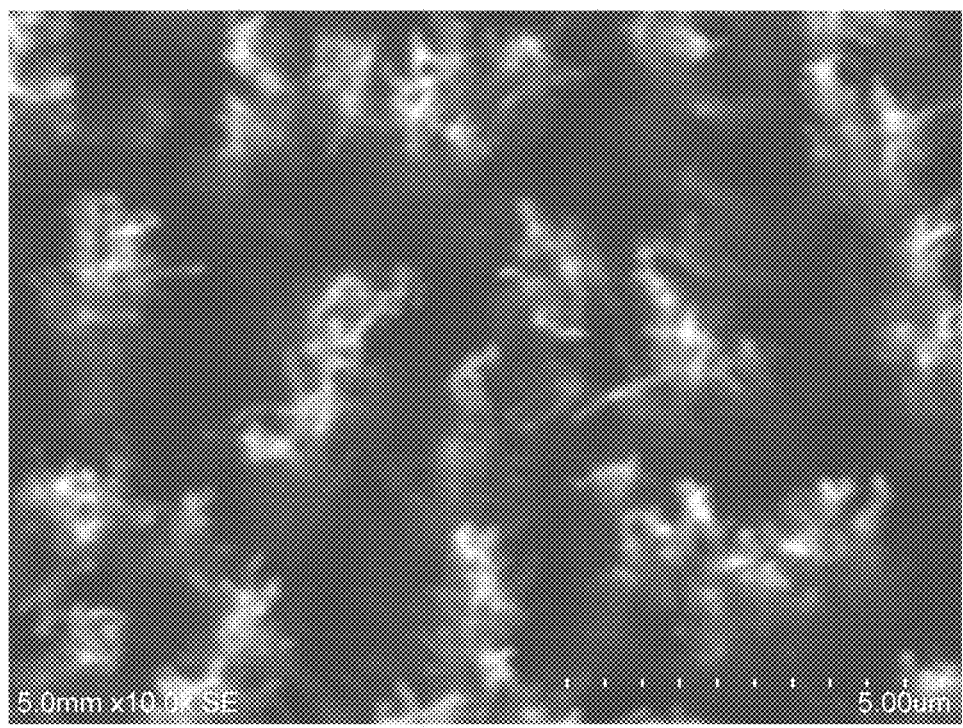

FIG. 12A is an image of an electrode where the height 114 of the support filament 110 is 3.5 microns. FIG. 12B is an image of an electrode where the height 114 of the support filament 110 is 17.5 microns. These support filaments in FIGS. 12A and 12B do not include intercalation material.

Figure 13A:
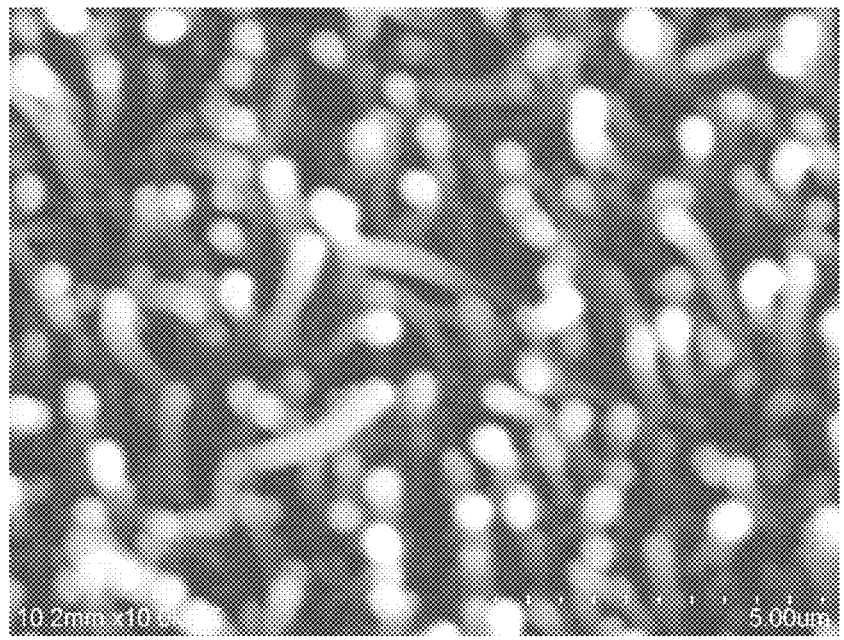
FIGS. 13A and 13B illustrate carbon nano-fibers grown on a copper substrate, coated with intercalation material, according to various embodiments of the invention.

FIG. 13A is an image of an electrode where the height 114 of the support filament 110 is 3.5 microns and 0.25 microns of silicon has been deposited as an intercalation layer 750. Data indicates that a 3.5 micron support filament 110, coated with 0.25 micron intercalation layer 750 (silicon), has very poor cycle life (<10 cycles.)

Figure 13B:
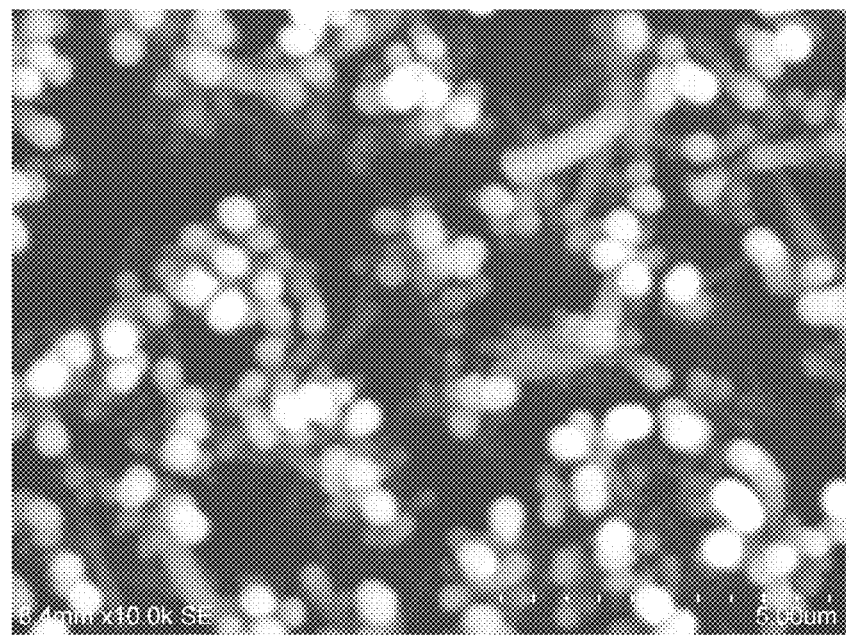

FIG. 13B is an image of an electrode where the height 114 of the support filament 110 is 17.5 microns and 0.25 microns of silicon has been deposited as an intercalation layer 750. Data indicates that a 17.5 micron support filament 110, coated with 0.25 micron intercalation layer 750 (silicon), has very good cycle life (>30 cycles, <20% capacity fade.) Various embodiments of the invention include support filaments 110 having a height 114 of at least 17.5 microns ($17.5 \times 10^{-6}$ meter) and at least 0.1, 0.25, 0.35, 0.5 or 0.75 microns of intercalation layer 750.

Figure 14:
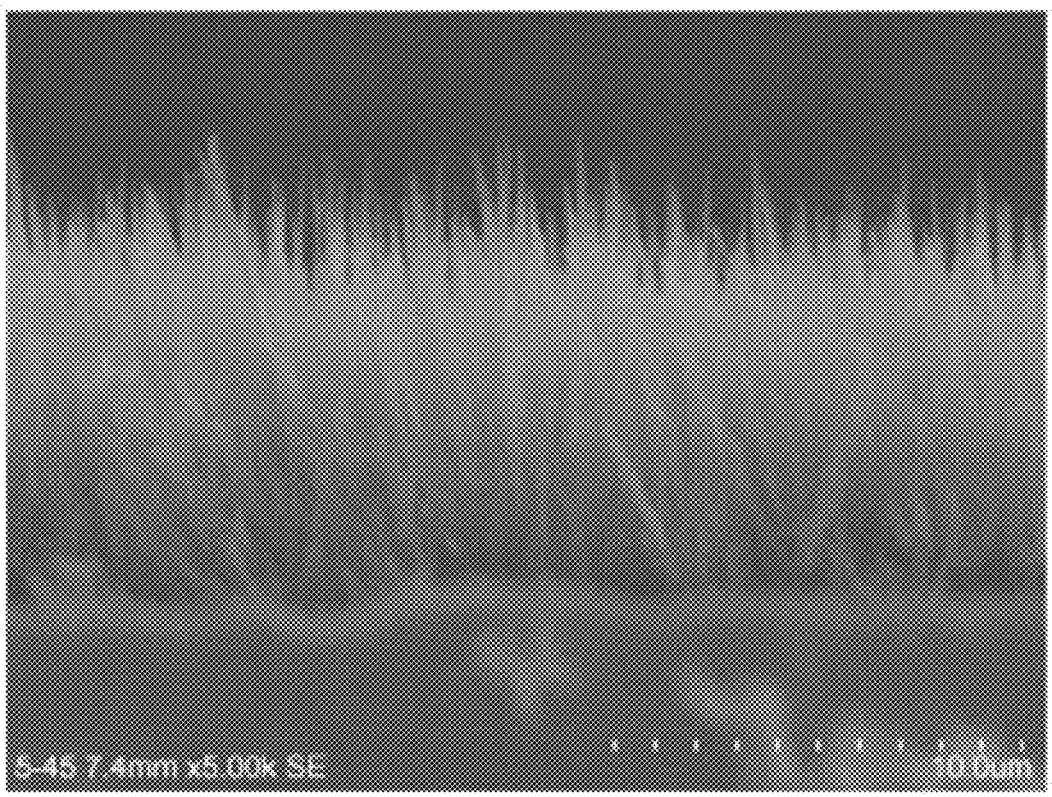
FIG. 14 illustrates a cross section of an electrode without intercalation layer 750 that was used to collect data for FIGS. 9 and 10, according to various embodiments of the invention.

FIG. 14 is a cross section of an electrode where the height 114 of the support filament is 10 microns and intercalation layer 750 is absent. This electrode design (with a measured linear deposited thickness of intercalation material of 0.5 microns, 1.5 microns, and 4.0 microns), has been tested and yielded the data presented in FIGS. 9 and 10. The results indicate enhanced capacity and improved cycle life at elevated temperatures (300 cycles, 40% capacity fade, C/2 rate, at 60 degrees centigrade). Various embodiments of the invention include support filaments 110 having a height 114 of at least 10 microns ($10.0 \times 10^{-6}$ meter) and at least 0.1, 0.25, 0.35, 0.5 or 0.75 microns of intercalation layer 750.

Several embodiments are specifically illustrated and/or described herein. However, it will be appreciated that modifications and variations are covered by the above teachings and within the scope of the appended claims without departing from the spirit and intended scope thereof. For example, the electrodes described herein can be used in devices other than batteries.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An electrode comprising:
   a substrate;
   a support filament coupled to the substrate, the support filament including a nano-filament;
   an intercalation layer including a donor acceptor material configured to receive a reactant of an electrochemical reaction, the donor acceptor material being disposed along the length of the support filament, a thickness of the intercalation layer being less than a length of the support filament;
   a region of the intercalation layer proximate to the substrate and including a lower amount of donor acceptor material relative to a region of the intercalation layer distal to the substrate; and,
   a collar stop disposed along the length of the support filament and configured to generate the region of the intercalation layer including a lower amount of the donor acceptor material.

2. The electrode of claim 1, wherein the support filament includes a carbon nano-tube or a carbon nano-fiber, or a nano-wire.

3. The electrode of claim 1, wherein the intercalation layer includes silicon, tin or germanium.

4. The electrode of claim 1, wherein the amount of intercalation material, in weight per unit area of support filament, in the region of the intercalation layer including a lower amount of donor acceptor includes less than 75% of the donor acceptor material in the region distal to the substrate.

5. The electrode of claim 1, wherein the amount of intercalation material, in weight per unit area of support filament, in the region of the intercalation layer including a lower amount of donor acceptor includes less than 50% of the donor acceptor material in the region distal to the substrate.

6. The electrode of claim 1, further comprising a support collar configured to prevent the intercalation layer from separating from the support filament.

7. The electrode of claim 1, further comprising a support cap configured to prevent the intercalation layer from separating from the support filament.

8. The electrode of claim 1, wherein the intercalation layer is p+ or n+ doped.

9. The electrode of claim 1, further comprising a seed layer disposed between the substrate and the support filament and configured to couple the support filament to the substrate.

10. The electrode of claim 1, wherein the support filament includes more than one support collar.

11. The electrode of claim 1, further comprising a carbide layer, an oxide layer or a nitride layer on a surface of the intercalation layer.

12. The electrode of claim 1, wherein the intercalation layer includes a metal.

13. The electrode of claim 1, wherein a surface of the intercalation layer is passivated.

14. A battery comprising:
    a first electrode; and
    a second electrode comprising
      a substrate,
      a support filament coupled to the substrate, the support filament including a nano-filament,
      an intercalation layer configured to receive a reactant of an electrochemical reaction, the intercalation layer being disposed on the support filament, and a collar stop configured for creating regions of the intercalation layer having different thicknesses along the length of the support filament.

15. The battery claim 14, wherein second electrode is configured to operate as an anode.

16. The battery of claim 14, further comprising means for preventing the intercalation layer from sliding off of the support filament.

17. The battery of claim 14, further comprising means for increasing the conductivity of the intercalation layer.

18. The electrode of claim 1, wherein the support filament includes a carbon nano-tube or a carbon nano-fiber.

19. The electrode of claim 12, where in the metal is selected to increase the conductivity of the intercalation layer.

20. The electrode of claim 6, wherein the support collar has a conical or triangular cross section.

21. The electrode of claim 6, wherein the support collar has a tapered shape.

22. The electrode of claim 1, wherein the intercalation layer includes a metal and an oxide.

23. The battery of claim 14, further comprising more than one support collar configured for creating regions of different thicknesses of the intercalation layer.

24. A battery comprising:
    a first electrode; and
    a second electrode comprising
      a substrate,
      support filaments grown from initiation sites on the substrate, the support filaments including nano-filaments and more than one support collar, wherein a ratio between a height of the support filaments above the substrate and an average separation between the support filament initiation sites is 5:1 or greater; and
      an intercalation layer configured to receive a reactant of an electrochemical reaction, the intercalation layer being disposed on the support filament.

25. The battery of claim 24, wherein the intercalation layer includes a metal and an oxide.

26. The battery of claim 24, wherein the intercalation layer includes silicon.

27. The battery of claim 24, wherein the intercalation layer includes silicon, a metal and an oxide.

28. The battery of claim 24, wherein the more than one support collar are configured to generate regions along the support filament having different thicknesses of intercalation layer.

29. The battery of claim 24, wherein the more than one support collar are configured to support attachment of the intercalation layer to the support filament.

30. The electrode of claim 1, wherein the support filament comprises a multi-walled carbon nanotube.

31. The battery of claim 24, wherein the ratio between the height of the support filaments above the substrate and the average separation between the support filament initiation sites is 10:1 or greater.

32. The electrode of claim 1, further comprising a support collar disposed along the length of the support filament where in the support collar has a support collar height that is less than or equal to 50 nanometers.

33. The electrode of claim 1, wherein the support filament includes regions that are at least 2.5% thicker than other regions of the support filament.

34. The electrode of claim 1, wherein a thickness of the intercalation layer is less than half an average separation distance between adjacent support filaments.

35. The electrode of claim 1, wherein the support filament is one of a plurality of aligned support filaments.

36. The battery of claim 14, wherein the intercalation layer has a deposited thickness, perpendicular to the length of the support filament, of less than or equal to 4 micrometers.

* * * * *